(12) United States Patent
Chen et al.

(10) Patent No.: US 9,092,344 B2
(45) Date of Patent: Jul. 28, 2015

(54) SOLID STATE DRIVE

(75) Inventors: Yi-Jen Chen, Hsinchu (TW); Chi-Sian Chuang, Hsinchu (TW); Yen-Chung Chen, Hsinchu (TW); Yun-Tzuo Lai, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 457 days.

(21) Appl. No.: 13/441,056

(22) Filed: Apr. 6, 2012

(65) Prior Publication Data
US 2013/0132642 A1 May 23, 2013

(30) Foreign Application Priority Data

Nov. 18, 2011 (CN) .......................... 2011 1 0369321

(51) Int. Cl.
*G06F 12/08* (2006.01)
(52) U.S. Cl.
CPC ...... *G06F 12/0866* (2013.01); *G06F 2212/214* (2013.01)

(58) Field of Classification Search
CPC .................................................. G06F 12/0871
See application file for complete search history.

(56) References Cited

U.S. PATENT DOCUMENTS

| 2011/0106804 A1* | 5/2011 | Keeler et al. .................. 707/737 |
| 2011/0225384 A1* | 9/2011 | Ly et al. ........................ 711/165 |

* cited by examiner

*Primary Examiner* — Eric S Cardwell
(74) *Attorney, Agent, or Firm* — WPAT, PC; Justin King

(57) ABSTRACT

A solid state drive includes a flash memory, a cache memory, and a controlling unit. The solid state drive is in communication with a host. The flash memory includes a plurality of blocks, wherein each of the blocks has a plurality of pages. The cache memory includes a plurality of cache units. The cache units are allocated into a plurality of groups according to operating statuses of respective cache units. The controlling unit is in communication with the host, the flash memory and the cache memory. Under control of the controlling unit, a write data from the host is temporarily stored in the cache memory so as to be written into the flash memory, or a read data from the flash memory is temporarily stored in the cache memory so as to be provided to the host.

7 Claims, 6 Drawing Sheets

SOLID STATE DRIVE

This application claims the benefit of People's Republic of China Application Serial No. 201110369321.5, filed Nov. 18, 2011, the subject matter of which is incorporated herein by reference.

FIELD OF THE INVENTION

The present invention relates to a storage device, and more particularly to a solid state drive. The present invention also relates to a method of managing a cache memory of the solid state drive.

BACKGROUND OF THE INVENTION

As is well known, a solid state drive (SSD) is a data storage device that uses a NAND-based flash memory to store data. The NAND-based flash memory is a non-volatile memory. After data are written to the flash memory, if no power is supplied to the flash memory, the data are still retained in the flash memory.

FIG. 1 is a schematic functional block diagram illustrating a conventional solid state drive. As shown in FIG. 1, the solid state drive 10 comprises a controlling unit 101, a cache memory 107, and a flash memory 105. In the solid state drive 10, the controlling unit 101 is in communication with the flash memory 105 and the cache memory 107 for controlling the data accessing operations of the flash memory 105 and the cache memory 107. In addition, the controlling unit 101 is in communication with a host 12 through an external bus 20. Consequently, commands and data can be exchanged between the controlling unit 101 and the host 12. Generally, the external bus 20 is a USB bus, an IEEE 1394 bus, a PCIe bus, an SATA bus, or the like.

Generally, the flash memory 105 comprises a plurality of blocks. Each block comprises a plurality of pages (or sectors), for example 128 pages. Each page is typically 8K bytes in size. Due to the inherent properties of the flash memory 105, at least one page is written at a time during the writing operation is performed, and the erasing operation is performed in a block-wise fashion.

Generally, the cache memory 107 is a buffering unit for temporarily storing the write data which is inputted through the host 12 or storing the read data which is outputted from the flash memory 105. In a case that no power is supplied to the cache memory 107, the data in the cache memory 107 will be deleted. The cache memory 107 is for example a static random access memory (SRAM) or a dynamic random access memory (DRAM). Since the cache memory 107 is acted as the buffering unit for the flash memory 105, the controlling unit 101 should efficiently manage the cache memory 107 while maintaining the data consistency between the cache memory 107 and the flash memory 105.

Basically, the cache memory 107 comprises a plurality of cache units. Each cache unit corresponds to an address. The cache units are managed by the controlling unit 101 through a cache link list.

FIG. 2 schematically illustrates a cache link list for the cache units of the conventional solid state drive. As shown in FIG. 2, each cache unit has a fixed address (A1~A8). The storage capacity of the data in the cache unit is equal to the size of one page for example. For each cache unit, the address of the previous cache unit, the address of the next cache unit, the status of the cache unit itself and the logical allocation address (LAA) of the flash memory 105 corresponding to the cache unit are recorded in the cache link list. Moreover, the status of the cache unit may include a free status, a write status, a read status, a need fill-up status, and a lock status.

In a case that no data or an invalid data is stored in the cache unit (e.g. the cache unit corresponding to address A8 or A1), the cache unit is in the free status. Under this circumstance, the cache unit can temporarily store the write data which is inputted through the host 12 or store the read data which is outputted from the flash memory 105.

In a case that the data of a complete page from the host 12 is temporarily stored in the cache unit (e.g. the cache unit corresponding to address A3 or A7), the cache unit is in the write status. Meanwhile, the data in these two cache units have not been written into the flash memory 105. Whereas, the data in these two cache units will be respectively written into the logical allocation addresses P1 and P4 of the flash memory 105.

In a case that the data of a partial page from the host 12 is temporarily stored in the cache unit (e.g. the cache unit corresponding to address A4), the cache unit is in the need fill-up status. Meanwhile, the data in the partial page has not been written into the flash memory 105. Whereas, after the data in the partial page has been processed, the data will be written into the logical allocation address P3 of the flash memory 105.

In a case that the data from the flash memory 105 is temporarily stored in the cache unit (e.g. the cache unit corresponding to address A2 or A6), the cache unit is in the read status. The read data have been transmitted from the logical allocation addresses P2 and P5 of the flash memory 105 to the cache units and the host 12.

In a case that the cache unit (e.g. the cache unit corresponding to address A5) is being processed by the controlling unit 101, the cache unit is in the lock status. Meanwhile, the data in the logical allocation address P6 of the flash memory 105 is being processed. Consequently, the data fails to be read from or written into this cache unit at this moment.

From the above discussions, in the conventional solid state drive 10, the cache units of the cache memory 107 are managed by the controlling unit 101 according to the cache link list. That is, the conventional cache memory utilizes the single cache link list to link all of cache units.

However, the way to use the single cache link list may deteriorate the performance of the controlling unit 101. For example, during a write back action is performed by the controlling unit 101, the cache units in the write state will be firstly searched, and then the data in these cache units are written back to the flash memory according to the logical allocation addresses (LAAs). Since the cache units are managed by the controlling units 101 according to the single cache link list, the controlling unit 101 may only sequentially search the write-status cache units starting from the first cache unit. Under this circumstance, the performance of the controlling unit 101 is largely impaired.

Similarly, in a case that controlling unit 101 wants to search the cache units in another status, it is necessary to search these cache units starting from the first cache unit. That is, the performance of the controlling unit 101 and the solid state drive 10 will be impaired.

SUMMARY OF THE INVENTION

The present invention provides a solid state drive and a method of managing a cache memory of the solid state drive. The cache units of the cache memory are divided into a plurality of groups according to the operating statuses of the cache units. Each group of cache units are managed according to a cache link list. That is, the cache units of the cache memory are managed by the controlling unit according to multiple cache link lists, so that the efficiency of the controlling unit is enhanced.

An embodiment of the present invention provides a solid state drive. The solid state drive is in communication with a host. The solid state drive includes a flash memory, a cache memory, and a controlling unit. The flash memory includes a plurality of blocks, wherein each of the blocks has a plurality of pages. The cache memory includes a plurality of cache units. A storage capacity of one or more cache units is equal to a size of one page of the flash memory. The cache units are allocated into a plurality of groups according to operating statuses of respective cache units. A relationship between the cache units of the first group is indicated by a first cache link list. A relationship between the cache units of the second group is indicated by a second cache link list. The controlling unit is in communication with the host, the flash memory and the cache memory. Under control of the controlling unit, a write data from the host is temporarily stored in the cache memory so as to be written into the flash memory, or a read data from the flash memory is temporarily stored in the cache memory so as to be provided to the host.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
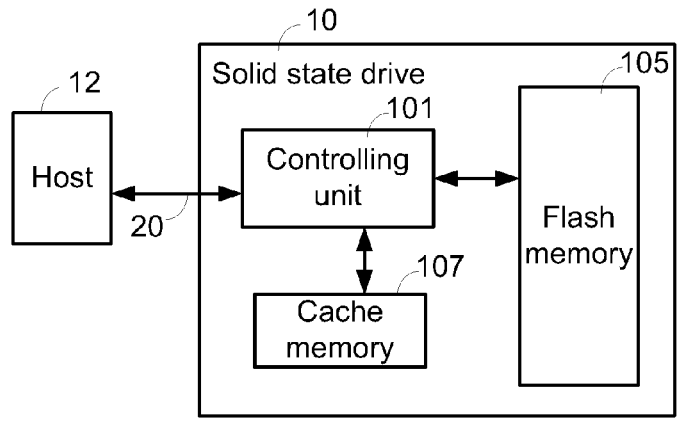
FIG. 1 (prior art) is a schematic functional block diagram illustrating a conventional solid state drive.
Figure 2:
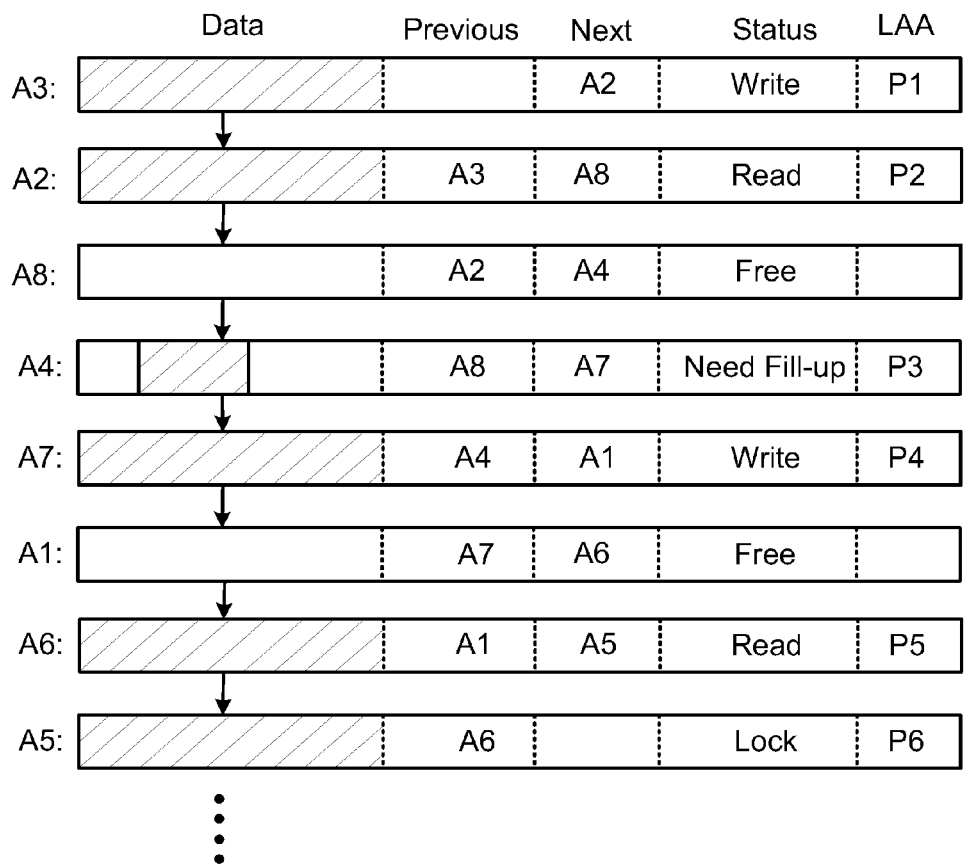
FIG. 2 (prior art) schematically illustrates a cache link list for the cache units of the conventional solid state drive.
Figure 4A:
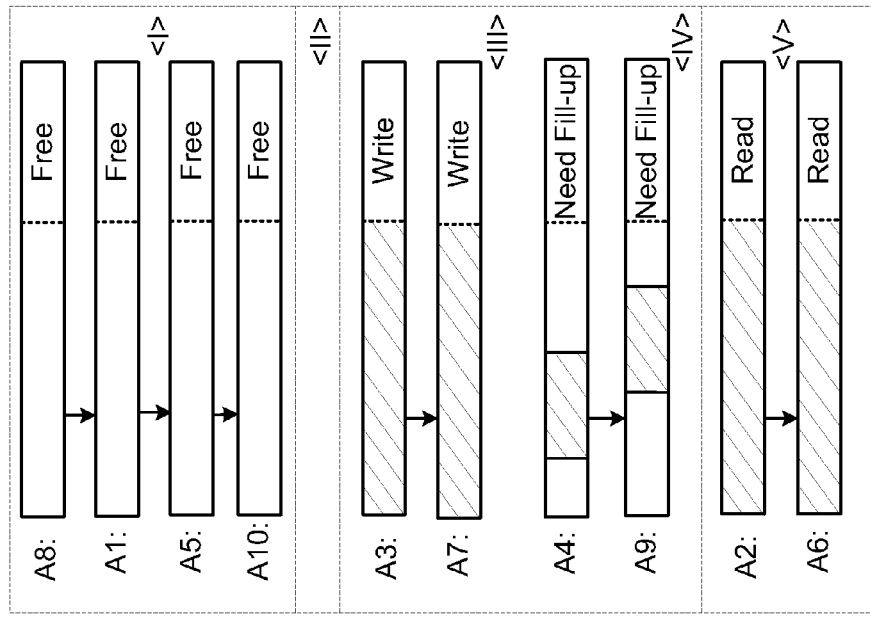
FIGS. 4A~4H schematically illustrate a method of managing the cache memory of the solid state drive according to an embodiment of the present invention.

As previously described, the use of a single cache link list to control the cache memory may reduce the performance of the controlling unit. In accordance with the present invention, the cache units of the cache memory are divided into a plurality of groups according to the operating statuses of the cache units. Each group of cache units are managed by utilizing a cache link list. That is, the cache units of the cache memory are managed by the controlling unit according to multiple cache link lists, so that the efficiency of the controlling unit is enhanced. For clarification and brevity, only the status fields are shown in the following cache link lists and the relationships between the cache units are indicated by arrows. The configurations of the solid state drive are similar to those of FIG. 1, and are not redundantly described herein.

Figure 3:
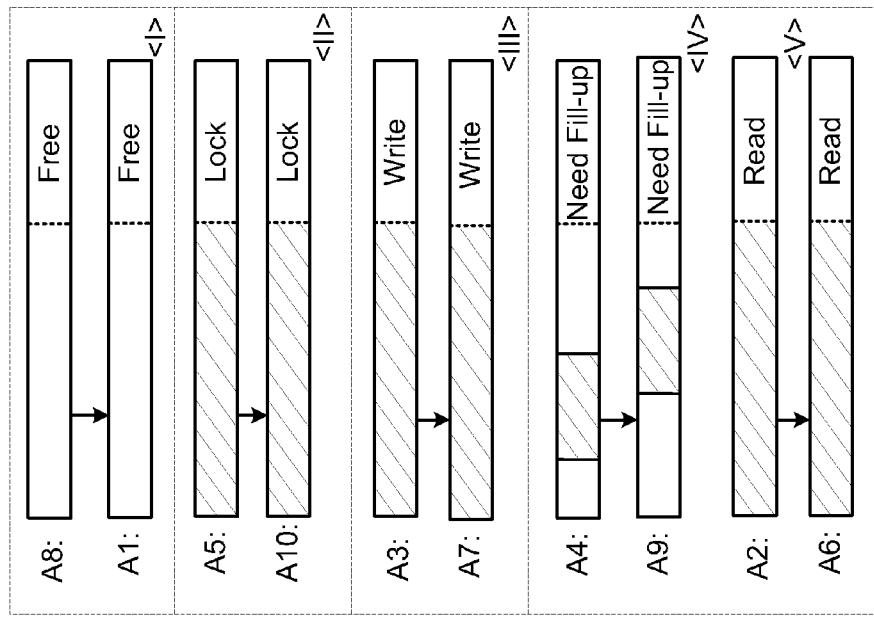
FIG. 3 schematically illustrates multiple cache link lists for the cache memory of the solid state drive according to an embodiment of the present invention.
Figures 4B, 4C:
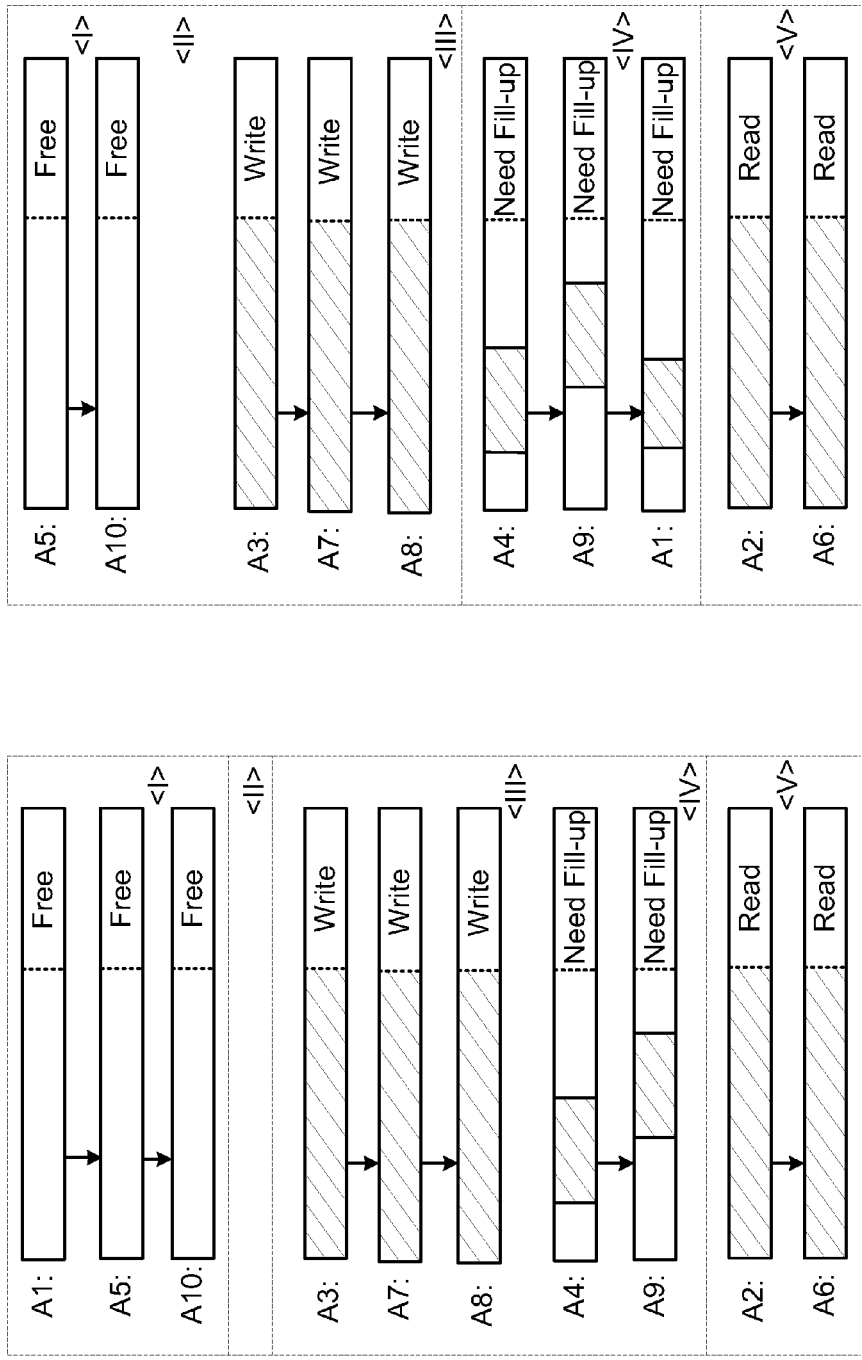
Figure 4E:
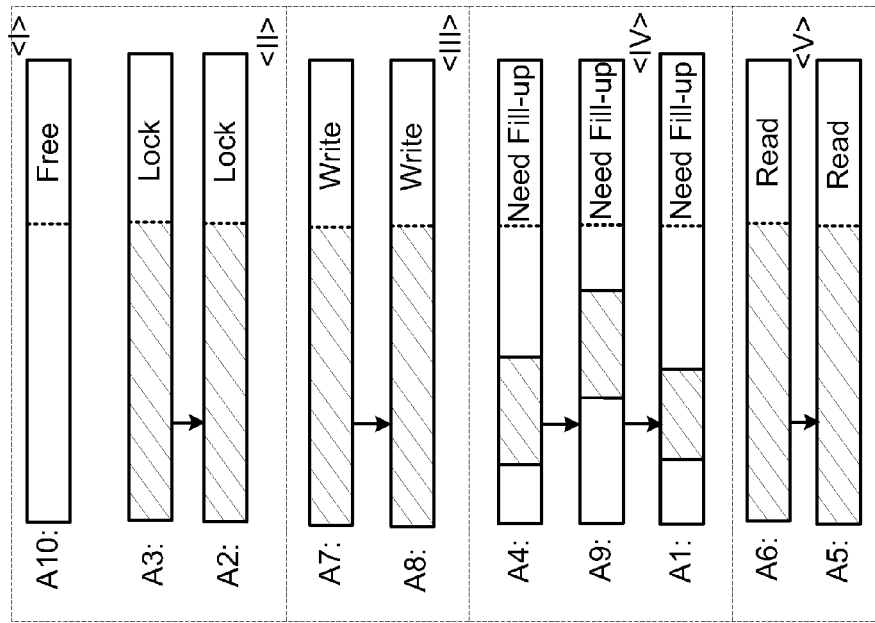
Figure 4D:
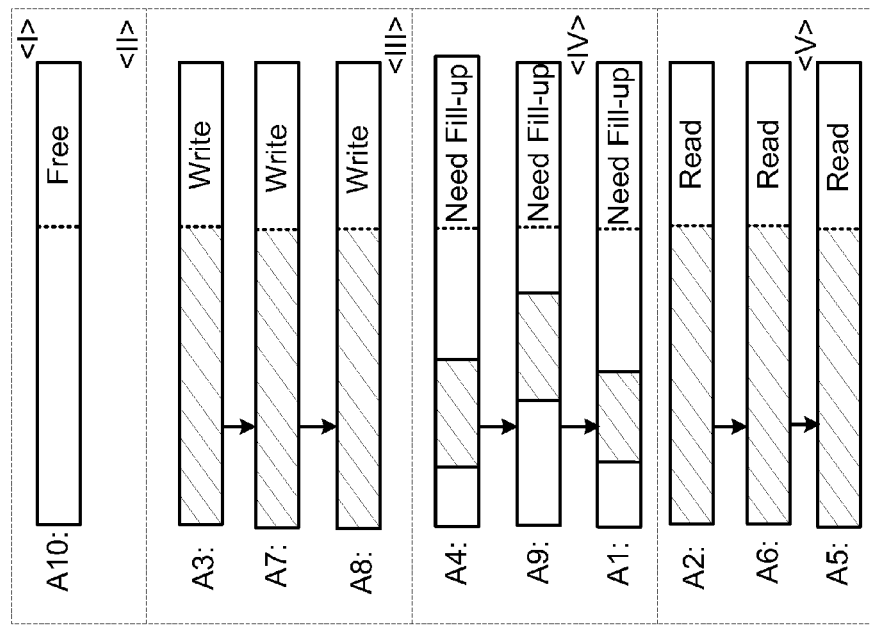
Figure 4G:
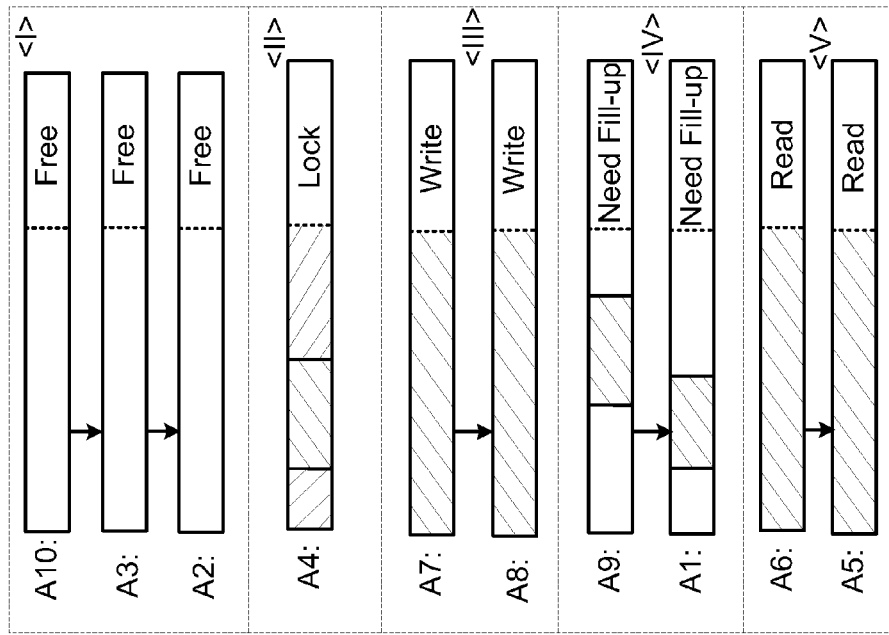
Figure 4F:
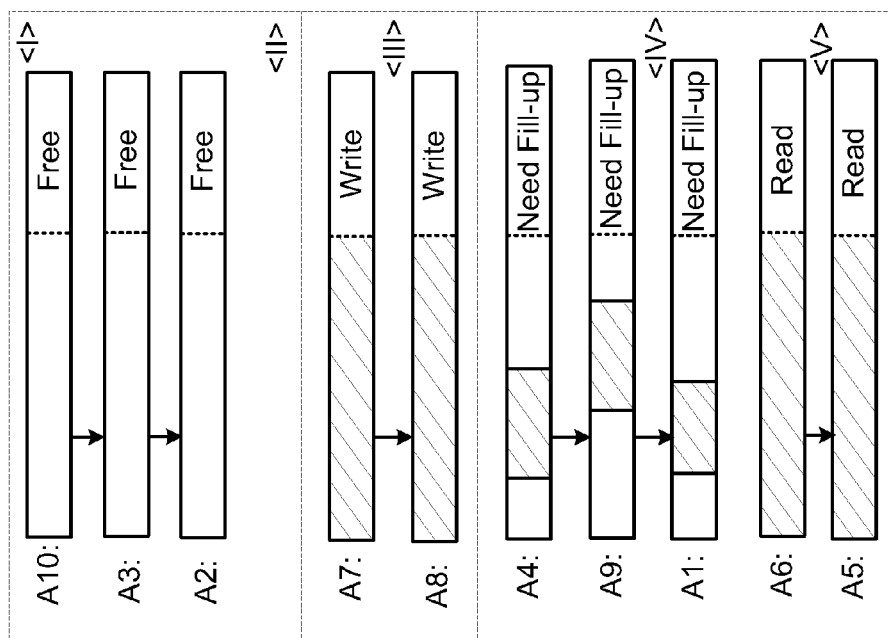
Figure 4H:
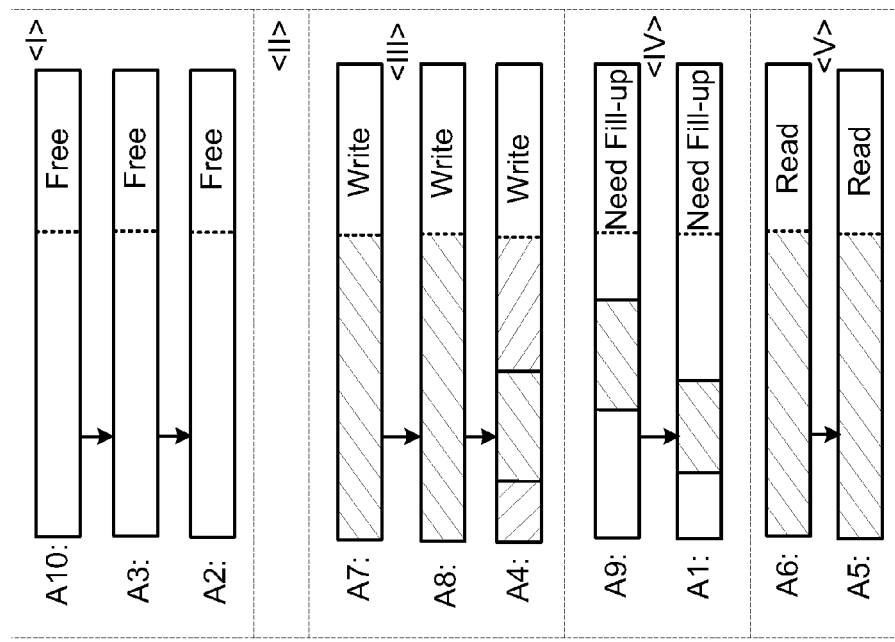

FIG. 3 schematically illustrates multiple cache link lists for the cache memory of the solid state drive according to an embodiment of the present invention. In accordance with the present invention, the cache memory comprises a plurality of cache units. The storage capacity of the data in one or more cache units is equal to the size of one page of the flash memory. According to the status fields, these cache units are divided into several groups (e.g. five groups). According to the properties of these groups, the cache units are controlled by the controlling unit.

In this embodiment, the cache units in the free status (e.g. the cache units corresponding to addresses A8 and A1) are classified into the first group <I>. In addition, a first cache link list indicates the relationship between the cache units of the first group <I>. The cache units in the lock status (e.g. the cache units corresponding to addresses A5 and A10) are classified into the second group <II>. In addition, a second cache link list indicates the relationship between the cache units of the second group <II>. The cache units in the write status (e.g. the cache units corresponding to addresses A3 and A7) are classified into the third group <III>. In addition, a third cache link list indicates the relationship between the cache units of the third group <III>. The cache units in the need fill-up status (e.g. the cache units corresponding to addresses A4 and A9) are classified into the fourth group <IV>. In addition, a fourth cache link list indicates the relationship between the cache units of the fourth group <IV>. The cache units in the read status (e.g. the cache units corresponding to addresses A2 and A6) are classified into the fifth group <V>. In addition, a fifth cache link list indicates the relationship between the cache units of the fifth group <V>.

As shown in FIG. 3, the five groups have a total of five cache link lists. The cache units of each group have the same status. As previously described in the prior art, the controlling unit needs to search the cache units in the specified status among all cache units according to the single cache link list. Since the controlling unit no longer needs to search the cache units in the specified status among all cache units of the solid state drive according to the present invention, the performance of the controlling unit will be effectively enhanced.

For well understanding the benefits of the present invention, a method of managing the cache memory will be illustrated in more details with reference to FIGS. 4A~4H and the cache link lists of the five groups as shown in FIG. 3.

FIGS. 4A~4H schematically illustrate a method of managing the cache memory of the solid state drive according to an embodiment of the present invention.

Firstly, according to the second cache link list of the second group <II>, the cache units in the lock status (e.g. the cache units corresponding to addresses A5 and A10) are sequentially processed by the controlling unit. The cache units corresponding to addresses A5 and A10 are processed to be in the free status and added to the first cache link list of the first group <I> (see FIG. 4A).

For allowing the solid state drive to receive the data of a complete page from the host, the controlling unit may select a cache unit in the free status (e.g. the cache unit corresponding to address A8) from the first cache link list of the first group <I> in order to store the data of the complete page from the host, and the operating status of this cache unit is switched to the write status. Then, the cache unit corresponding to address A8 and in the write status is allocated into the third cache link list of the third group <III> (see FIG. 4B).

In a case that the host wants to modify the data of a partial page of the flash memory, the controlling unit will select a cache unit in the free status (e.g. the cache unit corresponding to address A1) from the first cache link list of the first group <I> in order to store the data of the partial page from the host, and the operating status of this cache unit is switched to the need fill-up status. Then, the cache unit corresponding to address A1 and in the need fill-up status is allocated into the fourth cache link list of the fourth group <IV> (see FIG. 4C).

In a case that the host wants to read the data of a page from the flash memory, the controlling unit will select a cache unit in the free status (e.g. the cache unit corresponding to address A5) from the first cache link list of the first group <I> in order to store the data of the page from the flash memory, and the operating status of this cache unit is switched to the read status. Then, the cache unit corresponding to address A5 and in the read status is allocated into the fifth cache link list of the fifth group <V> (see FIG. 4D).

Once the number of cache units of the first group <I> in the free status is lower than a threshold value, the control unit will switch the statuses of some of the cache units of the third group <III> or the fifth group <V> (e.g. the cache units corresponding to addresses A3 and A2) into the lock status. Then, the cache units corresponding to addresses A3 and A2 and in the lock status are moved to the second group <II>, and the second cache link list of the second group <II> is updated (see FIG. 4E).

Next, according to the second cache link list of the second group <II>, the cache units in the lock status (e.g. the cache units corresponding to addresses A3 and A2) are sequentially processed by the controlling unit. For example, the data in the cache unit corresponding to address A3 is written back to the flash memory, and the data in the cache unit corresponding to address A2 is deleted. The cache units corresponding to addresses A3 and A2 are processed to be in the free status and added to the first cache link list of the first group <I> (see FIG. 4F).

Since each cache unit of the fourth group <IV> is in the need fill-up status, the cache unit of the fourth group <IV> only stores a part of the refreshed data rather than the data of a complete page. In other words, the data in the cache unit of the fourth group <IV> fails to be written back to the flash memory. The cache unit of the fourth group <IV> needs to read the unrefreshed data from the flash memory. The unrefreshed data from the flash memory and the part of the refreshed data are combined into the data of a complete page, which is then written back to the flash memory.

For example, the operating status of a cache unit of the fourth group <IV> (e.g. the cache unit corresponding to address A4) may be switched to the lock status by the controlling unit. Then, the cache unit corresponding to address A4 and in the lock status is moved to the second group <II>, and the second cache link list of the second group <II> is updated. Then, the unrefreshed data in the corresponding page of the flash memory is read by the controlling unit and stored in the cache unit corresponding to address A4. Consequently, the data of a complete page is stored in the cache unit corresponding to address A4 (see FIG. 4G).

Since the cache unit corresponding to address A4 of the second group <II> has stored the data of a complete page, the operating status is switched into the write status. Then, the cache unit corresponding to address A4 and in the write status is allocated into the third cache link list of the third group <III> (see FIG. 4H).

The method of managing the cache memory as shown in FIGS. 4A~4H is presented herein for purpose of illustration and description only. It is noted that numerous modifications and alterations may be made while retaining the teachings of the invention. For example, since the cache units in the free status and the cache units in the read status have no influence on the data consistency of the flash memory, the cache units in the free status and the cache units in the read status may be classified into the same group. Under this circumstance, the performance of the controlling unit is not adversely affected.

Moreover, the sequence through the first group to the fifth group and the sequence through the first cache link list to the fifth cache link list are not restricted. That is, the serial numbers of these groups and these cache link lists are used to distinguish different groups and different cache link lists.

From the above description, the present invention provides a solid state drive and a method of managing a cache memory of the solid state drive. In accordance with the present invention, the cache units of the cache memory are divided into a plurality of groups according to the operating statuses of the cache units. Each group of cache units are managed by utilizing a cache link list. That is, the cache units of the cache memory are managed by the controlling unit according to multiple cache link lists. In comparison with the prior art technology of using a single cache link list to control the cache memory, the efficiency of the controlling unit is largely enhanced according to the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A solid state drive in communication with a host, the solid state drive comprising:
   a flash memory comprising a plurality of blocks for storing data, wherein each of the blocks has a plurality of pages;
   a cache memory comprising a plurality of cache units for temporarily storing data from the host or the flash memory, wherein a storage capacity of one or more cache units is equal to a size of one page of the flash memory, and the cache units are allocated into a plurality of groups according to operating statuses of respective cache units, wherein a relationship between the cache units of the first group is indicated by a first cache link list, and a relationship between the cache units of the second group is indicated by a second cache link list; and
   a controlling unit in communication with the host, the flash memory and the cache memory, wherein under control of the controlling unit, a write data from the host is temporarily stored in the cache memory so as to be written into the flash memory, or a read data from the flash memory is temporarily stored in the cache memory so as to be provided to the host.

2. The solid state drive as claimed in claim 1, wherein the cache units of the first group are in a free status, and the cache units of the second group are in a write status, wherein when a data of a complete page is generated by the host, the controlling unit selects a first cache unit from the first cache link list of the first group to store the data of the complete page, and the controlling unit switches the operating status of the first cache unit into the write status and allocates the first cache unit into the second cache link list of the second group.

3. The solid state drive as claimed in claim 2, wherein the plurality of groups further comprises a third group, the cache units of the third group are in a need fill-up status, and a relationship between the cache units of the third group is indicated by a third cache link list, wherein when a data of a partial page is generated by the host, the controlling unit selects a second cache unit from the first cache link list of the first group to store the data of the partial page, and the controlling unit switches the operating status of the second cache unit into the need fill-up status and allocates the second cache unit into the third cache link list of the third group.

4. The solid state drive as claimed in claim 3, wherein the plurality of groups further comprises a fourth group, the cache units of the fourth group are in a lock status, and a relationship between the cache units of the fourth group is indicated by a fourth cache link list, wherein for writing a data of the second group back to the flash memory, the controlling unit selects a third cache unit from the second cache link list of the second group, and the controlling unit switches the operating status of the third cache unit into the lock status and allocates the third cache unit into the fourth cache link list of the fourth group.

5. The solid state drive as claimed in claim 4, wherein after the data of the third cache unit of the fourth group has been written back to the flash memory, the controlling unit switches the operating status of the third cache unit into the free status and allocates the third cache unit into the first cache link list of the first group.

6. The solid state drive as claimed in claim 4, wherein the controlling unit further selects a fourth cache unit from the third cache link list of the third group, and the controlling unit switches the operating status of the fourth cache unit into the lock status and adds the fourth cache unit into the fourth cache link list of the fourth group, wherein after a data of a complete page has been stored in the fourth cache unit, the controlling unit switches the operating status of the fourth cache unit into the write status and allocate the fourth cache unit into the second cache link list of the second group.

7. The solid state drive as claimed in claim 1, wherein the cache units of the first group are in a free status, and the cache units of the second group are in a read status, wherein for transmitting the read data from the flash memory to the host, the controlling unit selects a first cache unit from the first cache link list of the first group to store the read data, and the controlling unit switches the operating status of the first cache unit into the read status and allocates the first cache unit into the second cache link list of the second group.

* * * * *